US006879667B1

(12) United States Patent
Carew et al.

(10) Patent No.: US 6,879,667 B1
(45) Date of Patent: Apr. 12, 2005

(54) SYSTEM AND METHOD FOR INTERFACING TELEPHONY VOICE SIGNALS WITH A BROADBAND ACCESS NETWORK

(75) Inventors: A. J. Paul Carew, Austin, TX (US); Anthony H. Anconetani, Round Rock, TX (US); I. Steve Gerson, Austin, TX (US); George D. O'Brien, Jr., Austin, TX (US); Matthew A. Pendleton, Cedar Park, TX (US); Peter J. Renucci, Austin, TX (US); Donald L. Sparks, Austin, TX (US); Robert H. Whitcher, Austin, TX (US)

(73) Assignee: General Bandwidth Inc., Austin, TX (US)

( * ) Notice: Subject to any disclaimer, the term of this patent is extended or adjusted under 35 U.S.C. 154(b) by 163 days.

(21) Appl. No.: 10/131,121

(22) Filed: Apr. 23, 2002

Related U.S. Application Data (60) Provisional application No. 60/289,303, filed on May 7, 2001.

(51) Int. Cl.⁷ .............................................. H04M 1/64
(52) U.S. Cl. ................................... 379/88.17; 370/397
(58) Field of Search .................... 379/88.17, 406.06, 379/201.01; 370/397

(56) References Cited

U.S. PATENT DOCUMENTS

| | | | |
|---|---|---|---|
| 4,381,427 A | 4/1983 | Cheal et al. ............... 179/2 DP |
| 4,493,092 A | 1/1985 | Adams ......................... 375/36 |
| 4,504,942 A | 3/1985 | Aro et al. ...................... 370/58 |
| 4,507,793 A | 3/1985 | Adams ......................... 375/36 |
| 4,512,025 A | 4/1985 | Frankel et al. ................. 375/36 |
| 4,578,537 A | 3/1986 | Faggin et al. .............. 179/2 DP |
| 4,608,686 A | 8/1986 | Barsellotti ................. 370/69.1 |
| 4,627,046 A | 12/1986 | Bellamy ....................... 370/58 |
| 4,740,963 A | 4/1988 | Eckley ....................... 370/110.1 |
| 4,748,656 A | 5/1988 | Gibbs et al. ................... 379/93 |

(Continued)

FOREIGN PATENT DOCUMENTS

| | | | |
|---|---|---|---|
| EP | 0 841 831 A2 | 5/1998 | .......... H04Q/11/04 |
| GB | 2313979 A | 12/1997 | .......... H04M/11/06 |
| WO | WO 97/23078 | 6/1997 | .......... H04L/12/56 |
| WO | WO 97/37458 | 10/1997 | |
| WO | WO 98/42104 | 9/1998 | .......... H04L/12/28 |

(Continued)

OTHER PUBLICATIONS

Newton's Telecom Dictionary, pgs. 306/358 13th Edition for definition of Gateway/Interface, Jan. 1998.*

Gudapati, et al., "Local Telephone Service for Cable Subscribers Using Packet Switched Access," ISS. World Telecommunications Congress, pp. 325–329, Sep. 21, 1997.

(Continued)

*Primary Examiner*—Creighton Smith
(74) *Attorney, Agent, or Firm*—Baker Botts L.L.P.

(57) ABSTRACT

A voice gateway (18) in a telecommunications network (1) includes a plurality of telephony port modules (102). Each telephony port module (102) receives telephony voice signals from a public switched telephony network (13). Each telephony port module (102) includes one or more digital signal processors (110) that perform one or more processing functions on the telephony voice signals. A particular telephony port module (102) may receive a telephony voice signal and use its associated digital signal processor (110) to process the received telephony voice signal or transfer the received telephony voice signal for processing to any digital signal processor (110) on any telephony port module (102). Telephony signals may also be transferred for processing to digital signal processors (110) on another voice gateway (18) in a voice gateway system.

17 Claims, 5 Drawing Sheets

U.S. PATENT DOCUMENTS

| | | |
|---|---|---|
| 4,757,497 A | 7/1988 | Bierele et al. ............... 370/89 |
| 4,843,606 A | 6/1989 | Bux et al. ..................... 370/89 |
| 4,853,949 A | 8/1989 | Schorr et al. .................. 379/2 |
| 4,881,226 A | 11/1989 | Lechner et al. .......... 370/110.1 |
| 4,903,292 A | 2/1990 | Dillon ......................... 379/93 |
| 5,033,062 A | 7/1991 | Morrow et al. ............... 375/7 |
| 5,034,948 A | 7/1991 | Mizutani et al. ............. 370/79 |
| 5,127,003 A | 6/1992 | Doll, Jr. et al. .......... 370/110.1 |
| 5,134,611 A | 7/1992 | Steinka et al. ............... 370/79 |
| 5,142,350 A | 8/1992 | Doll, Jr. et al. .......... 370/110.1 |
| 5,142,571 A | 8/1992 | Suzuki et al. ............... 370/79 |
| 5,151,923 A | 9/1992 | Fujuwara ..................... 375/5 |
| 5,216,704 A | 6/1993 | Williams et al. ............ 379/93 |
| 5,220,560 A | 6/1993 | Ogasawara ................. 370/79 |
| 5,247,347 A | 9/1993 | Litteral et al. ............... 358/85 |
| 5,267,300 A | 11/1993 | Kao et al. ..................... 379/93 |
| 5,305,312 A | 4/1994 | Fornek et al. ................ 370/62 |
| 5,317,627 A | 5/1994 | Richardson, Jr. et al. ..... 379/88 |
| 5,341,374 A | 8/1994 | Lewen et al. ............. 370/85.4 |
| 5,349,640 A | 9/1994 | Dunn et al. ................. 379/387 |
| 5,367,522 A | 11/1994 | Otani ......................... 370/84 |
| 5,410,343 A | 4/1995 | Coddington et al. ........... 348/7 |
| 5,426,692 A | 6/1995 | Fujise ......................... 379/93 |
| 5,448,635 A | 9/1995 | Biehl et al. ................. 379/399 |
| 5,459,788 A | 10/1995 | Kim ........................... 379/399 |
| 5,473,675 A | 12/1995 | Chapman et al. ............ 379/93 |
| 5,479,447 A | 12/1995 | Chow et al. ................ 375/260 |
| 5,493,609 A | 2/1996 | Winseck, Jr. et al. ......... 379/96 |
| 5,499,241 A | 3/1996 | Thompson et al. ........... 370/73 |
| 5,604,737 A | 2/1997 | Iwami et al. ............... 370/352 |
| 5,606,553 A | 2/1997 | Christie et al. ............. 370/394 |
| 5,610,910 A | 3/1997 | Focsaneanu et al. ........ 370/351 |
| 5,610,922 A | 3/1997 | Balatoni ..................... 370/468 |
| 5,613,069 A | 3/1997 | Walker ................. 395/200.15 |
| 5,617,423 A | 4/1997 | Li et al. ...................... 370/426 |
| 5,623,491 A * | 4/1997 | Skoog ........................ 370/397 |
| 5,625,404 A | 4/1997 | Grady et al. ................... 348/7 |
| 5,625,685 A | 4/1997 | Allegranza et al. ......... 379/399 |
| 5,638,363 A | 6/1997 | Gittins et al. .............. 370/358 |
| 5,661,785 A | 8/1997 | Carpenter et al. ........ 379/93.15 |
| 5,668,857 A | 9/1997 | McHale ................... 379/93.07 |
| 5,671,251 A | 9/1997 | Blackwell et al. .......... 375/222 |
| 5,673,290 A | 9/1997 | Cioffi ......................... 375/260 |
| 5,675,575 A | 10/1997 | Wall, Jr. et al. ............ 370/326 |
| 5,692,035 A | 11/1997 | O'Mahony et al. ......... 379/93 |
| 5,719,870 A | 2/1998 | Baker et al. ................. 370/463 |
| 5,737,333 A | 4/1998 | Civaniar et al. ............. 370/352 |
| 5,771,236 A | 6/1998 | Sansom et al. ............. 370/458 |
| 5,781,547 A | 7/1998 | Wilson ....................... 370/395 |
| 5,781,617 A | 7/1998 | McHale et al. .......... 379/93.14 |
| 5,787,088 A | 7/1998 | Dagdeviren et al. ........ 370/493 |
| 5,793,843 A | 8/1998 | Morris ......................... 379/59 |
| 5,828,666 A | 10/1998 | Focsaneanu et al. ........ 370/389 |
| 5,838,682 A | 11/1998 | Dekelbaum et al. ........ 370/401 |
| 5,841,840 A | 11/1998 | Smith et al. ............. 379/93.01 |
| 5,848,150 A | 12/1998 | Bingel ........................ 379/399 |
| 5,862,134 A | 1/1999 | Deng ......................... 370/352 |
| 5,864,747 A | 1/1999 | Clark et al. ................. 455/3.2 |
| 5,872,993 A * | 2/1999 | Brown ......................... 712/35 |
| 5,878,120 A | 3/1999 | O'Mahony ............... 379/93.09 |
| 5,881,142 A | 3/1999 | Frankel et al. .............. 379/167 |
| 5,883,941 A | 3/1999 | Akers ....................... 379/93.08 |
| 5,889,773 A | 3/1999 | Stevenson, III ............ 370/352 |
| 5,889,774 A | 3/1999 | Mirashrafi et al. .......... 370/352 |
| 5,889,856 A | 3/1999 | O'Toole et al. ............. 379/399 |
| 5,896,377 A | 4/1999 | Boot et al. ................. 370/352 |
| 5,898,761 A | 4/1999 | McHale et al. .......... 379/93.01 |
| 5,901,205 A | 5/1999 | Smith et al. ............. 379/93.01 |
| 5,905,781 A | 5/1999 | McHale et al. .......... 379/93.14 |
| 5,907,548 A | 5/1999 | Bernstein ................... 370/353 |
| 5,917,814 A | 6/1999 | Balatoni ..................... 370/352 |
| 5,936,952 A | 8/1999 | Lecomte ..................... 370/352 |
| 5,940,479 A | 8/1999 | Guy et al. ............... 379/93.01 |
| 5,943,404 A | 8/1999 | Sansom et al. .......... 379/93.06 |
| 5,949,763 A | 9/1999 | Lund .......................... 370/261 |
| 5,974,043 A | 10/1999 | Solomon .................... 370/352 |
| 5,978,390 A | 11/1999 | Balatoni ..................... 370/540 |
| 5,982,767 A | 11/1999 | McIntosh ................... 370/352 |
| 5,991,292 A | 11/1999 | Focsaneanu et al. ........ 370/352 |
| 5,999,565 A | 12/1999 | Locklear, Jr. et al. ....... 375/222 |
| 5,999,598 A | 12/1999 | Henrick et al. .......... 379/93.07 |
| 6,075,784 A | 6/2000 | Frankel et al. .............. 370/356 |
| 6,075,796 A | 6/2000 | Katseff et al. .............. 370/466 |
| 6,078,580 A | 6/2000 | Mandalia et al. ........... 370/352 |
| 6,081,517 A | 6/2000 | Liu et al. ..................... 370/352 |
| 6,101,182 A | 8/2000 | Sistanizadeh et al. ....... 370/352 |
| 6,112,084 A | 8/2000 | Sicher et al. ............... 455/426 |
| 6,118,780 A | 9/2000 | Dunn et al. ................. 370/355 |
| 6,125,113 A | 9/2000 | Farris et al. ................ 370/389 |
| 6,125,117 A | 9/2000 | Martin et al. ............... 370/397 |
| 6,128,307 A * | 10/2000 | Brown ....................... 379/412 |
| 6,130,879 A | 10/2000 | Liu ............................. 370/230 |
| 6,130,883 A | 10/2000 | Spear et al. ................. 370/328 |
| 6,134,235 A | 10/2000 | Goldman et al. ........... 370/352 |
| 6,141,339 A | 10/2000 | Kaplan et al. .............. 370/352 |
| 6,144,667 A | 11/2000 | Doshi et al. ................. 370/401 |
| 6,144,670 A | 11/2000 | Sponaugle et al. ......... 370/401 |
| 6,154,445 A | 11/2000 | Farris et al. ................. 370/237 |
| 6,157,637 A | 12/2000 | Galand et al. .............. 370/356 |
| 6,167,042 A | 12/2000 | Garland et al. ............. 370/354 |
| 6,175,562 B1 | 1/2001 | Cave .......................... 370/352 |
| 6,175,854 B1 | 1/2001 | Bretscher .................... 709/201 |
| 6,181,694 B1 | 1/2001 | Pickett ........................ 370/353 |
| 6,181,715 B1 | 1/2001 | Phillips et al. .............. 370/493 |
| 6,201,806 B1 | 3/2001 | Moffett ....................... 370/356 |
| 6,208,639 B1 | 3/2001 | Murai ......................... 370/356 |
| 6,222,829 B1 | 4/2001 | Karlsson et al. ............ 370/329 |
| 6,229,810 B1 | 5/2001 | Gerszberg et al. .......... 370/401 |
| 6,236,653 B1 | 5/2001 | Dalton et al. ............... 370/352 |
| 6,240,084 B1 | 5/2001 | Oran et al. .................. 370/352 |
| 6,240,085 B1 | 5/2001 | Iwami et al. ............... 370/352 |
| 6,240,086 B1 * | 5/2001 | Morgan et al. ............. 370/352 |
| 6,243,377 B1 | 6/2001 | Phillips et al. .............. 370/354 |
| 6,243,398 B1 | 6/2001 | Kahane et al. .............. 370/522 |
| 6,259,708 B1 | 7/2001 | Cheng et al. ............... 370/493 |
| 6,262,979 B1 | 7/2001 | Anderson et al. ........... 370/267 |
| 6,411,899 B2 * | 6/2002 | Dussell et al. .............. 701/211 |
| 6,633,635 B2 * | 10/2003 | Kung et al. ............. 379/215.01 |
| 2001/0024439 A1 * | 9/2001 | Morgan et al. ............. 370/352 |

FOREIGN PATENT DOCUMENTS

| | | | |
|---|---|---|---|
| WO | WO 99/49608 | 9/1999 | |
| WO | WO 00/56050 | 9/2000 | .......... H04M/11/00 |
| WO | WO 00/69131 | 11/2000 | .......... H04L/12/64 |
| WO | WO 01/05130 A1 | 1/2001 | .......... H04M/3/48 |
| WO | WO 01/06720 A1 | 1/2001 | .......... H04L/12/64 |
| WO | WO 01/13593 A1 | 2/2001 | .......... H04L/12/64 |
| WO | WO 01/13618 A1 | 2/2001 | .......... H04M/11/06 |

OTHER PUBLICATIONS

L. Van Hauwermeiren, et al., "Offering Video Services over Twisted Pair Cables to the Residential Subscriber by Means of an ATM Based ADSL Transmission System," ISS Symposium, vol. 1, 5 pages, Apr. 1995.

T.C. Kwok, "Residential Broadband Architecture Over ADSL and G. Lite (G.992.2): PPP Over ATM," XP–000830885, IEEE Communication Magazine, 6 pages, May 1999.

Notification of Transmittal of the International Search Report or the Declaration, 6 pages, May 2, 2001.

Notification of Transmittal of the International Search Report or the Declaration, 7 pages, Jun. 29, 2001.

Notification of Transmittal of the International Search Report or the Declaration, 6 pages, Oct. 19, 2001.

Unknown, "Gateway control protocol," ITU–T Telecommunication Standardization Sector of ITU, Series H: Audiovisual and Multimedia Systems, Infrastructure of audiovisual services—Communication procedures, ITU–T Recommendation H.248, 224 pages, Jun. 2000.

Unknown, "Packet–based multimedia communications sytems," ITU–T Telecommunication Standardization Sector of ITU, Series H: Audiovisual and Multimedia Systems, Infrastructure of audiovisual services—Systems and terminal equipment for audiovisual services, ITU–T Recommendation H.323, 124 pages, Feb. 1998.

Unknown, "Voice and Telephony Over ATM—ATM Trunking using AAL1 for Narrowband Services, Version 1.0," The ATM Forum Technical Committee, AF–VTOA–0089.000, 64 pages, Jul. 1997.

Unknown, "Voice and Telephony Over ATM to the Desktop Specification," The ATM Forum Technical Committee, af–vtoa–0083.000, 43 pages, May 1997.

Unknown, "Call Signaling Protocols and Media Stream Packetization for Packet Based Multimedia Communications Systems," ITU–T Telecommunication Standardization Sector of ITU, Line Transmission of Non–Telephone Signals, ITU–T Recommentation H.225.0, Version 2, 141 pages, Mar. 25, 1997.

Unknown, "Visual telephone systems and equipment for local area networks which provide an non–guaranteed quality of service," ITU–T Telecommunication Standardization Sector of ITU, Series H: Audiovisual and Multimedia Services,—Systems and terminal equipment for audiovisual sercies, ITU–T Recommendation H.323, 79 pages, Nov. 1996.

Unknown, "Adaptation of H.320 visual telephone terminals to B–ISDN environments," ITU–T Telecommunication Standardization Sector of ITU, Series H: Transmission of Non–Telephone Signals, Infrastructure of audiovisual services—Systems and terminal equipment for audiovisual services, ITU–T Recommendation H.321, 20 pages, Mar. 1996.

J.M. Fossaceca, J.D. Sandoz, and P. Winterbottom, "The PathStar™ Access Server: Facilitating Carrier–Scale Packet Telephony," Bell Labs Technical Journal, 17 pages, Oct.–Dec. 1998.

F. Dawson, Contributing Editor, "Packet–Based Voice, Video Becoming Real Market, New software codecs make integration of voice over data networks more feasible and affordable," http://www.zdnet.com/intweek/print/970303/inwk0006.html, 6 pages, c 1997 Aug. 7, 2001.

Unknown, "Telogy Networks' Voice over Packet White Paper," http://www.telogy.com/our_product/golden_gateway/VOPwhite.html, 14 pages, Aug. 7, 2001.

Unknown Author, "The Role of Voice–Data Integration in Transforming your Business to e–business," IBM Networking White Papers: Voice–Data Integration in e–business, http://wwwnetworking.ibm.com/voice/voice–data.html, 23 pages, Aug. 7, 2001.

Unknown Author, Press Release, "VOCALTEC expands telephony gateway product line with new eight–line solution for corporate intranets and internet service providers," VocalTec—The First and the Best, http://www.vocaltec.com/html/news1996/press_11_25.html, 5 pages, Aug. 7, 2001.

Unknown Author, Press Release, "VOCALTEC Introduces the internet phone telephony gateway linking tradition and internet telephone networks," VocalTec—The First and the Best, http://www.vocaltec.com/html/news1996/press_03_08.html, 3 pages, Aug. 7, 2001.

Unknown Author, Press Release, "VOCALTEC's telephony gateway software captures 1996 product of the year honors from Computer Telephony magazine," VocalTec—The First and the Best, http://www.vocaltec.com/html/news1996/press_12_18.html, 3 pages, Aug. 7, 2001.

V.C. Majeti, "A Network Management Model for ADSL–based Broadband Systems," ADSL Forum Network Management Group, Brussels, Belgium, ADSL–Forum 97–112, 4 pages, Sep. 15, 1997.

V.C. Majeti, "Network Management System (NMS) Operations for ADSL–based Broadband Systems," ADSL Forum Network Management Group, Brussels, Belgium, ADSL Forum 97–113, 4 pages, Sep. 15, 1997.

Unknown Author, "Network Migration Working Text," ADSL Forum WT–013, ADSLForum WT013, Draft D, 60 pages, Jul. 8, 1997.

Unknown Author, "Network Migration Working Text," ADSL Forum WT–013, ADSLForum WT013, Draft C, 55 pages, Apr. 18 1997.

Unknown Author, "Network Migration Working Text," ADSL Forum WT–013, ADSLForum WT013, Draft B, 53 pages, Jan. 12 1997.

Unknown Author, "Network Migration Working Text," ADSL Forum WT–00x, ADSLForum 96–116, 32 pages, Dec. 10, 1996.

Unknown Author, "A Discussion of Voice over Frame Delay," Voice over FR, http://www.frforum.com/4000/4017052699.html, 10 pages, Aug. 7, 2001.

M. Coronaro, B. Rossi, "Integrated Office Communication System," Office Communication System, Electrical Communication—vol. 60, No. 1, 1986.

L. Van Hauwermeiren, et al., "Offering Video Services over Twisted Pair Cables to the Residential Subscriber by means of an ATM based ADSL Transmission System," ISS Symposium, vol. 1, 5 pages, Apr. 1995.

T.C. Kowk, "Residential Broadband Architecture Over ADSL and G.Lite (G.992.2): PPP Over ATM," XP–000830885, IEEE Communication Magazine, 6 pages, May 1999.

Notification of Transmittal of the International Search Report or the Declaration, 7 pages, May 2, 2001, Jun. 29, 2001.

* cited by examiner

SYSTEM AND METHOD FOR INTERFACING TELEPHONY VOICE SIGNALS WITH A BROADBAND ACCESS NETWORK

RELATED APPLICATIONS

This application claims the benefit of U.S. Provisional Application Ser. No. 60/289,303 filed May 7, 2001.

TECHNICAL FIELD OF THE INVENTION

The present invention relates in general to telecommunications signal processing and more particularly to a system and method for interfacing telephony voice signals with a broadband access network.

BACKGROUND OF THE INVENTION

Voice over Internet Protocol (VoIP), Voice over ATM (VoATM), and Voice over DSL (VoDSL) are technologies just beginning to be deployed in telecommunications networks. These technologies, collectively known as Voice over Broadband (VoB), are bridged from a wide area network (WAN) environment to the public switched telephone network (PSTN) through the use of a voice gateway. Initial deployments of voice gateways have handled a few number of voice and data calls. However, as VoB technology becomes more widespread, current voice gateways will need to handle a greater capacity and thus will require an ability to expand in order to handle the increased capacity. Expanding the capacity of a voice gateway requires additional PSTN interfaces, WAN interfaces, voice compression, and echo cancellation to handle more calls. Voice compression and echo cancellation is implemented in a voice gateway through the use of digital signal processor technology. Digital signal processors are expensive in terms of cost, power, and board real estate. Therefore, it is desirable to grow the call capability of a voice gateway without interrupting existing services, without changing existing equipment, and by efficiently making use of digital signal processor resources.

SUMMARY OF THE INVENTION

From the foregoing, it may be appreciated by those skilled in the art that a need has arisen to enhance call capacity of a voice gateway and make efficient use of digital signal processing resources within a telecommunications system. In accordance with an embodiment of the present invention, a system and method for interfacing telephony voice signals with a broadband access network are provided that substantially eliminate or greatly reduce disadvantages and problems associated with conventional telecommunications systems.

According to an embodiment of the present invention, there is provided a system for interfacing telephony voice signals with a broadband access network that includes a plurality of telephony port modules that receive telephony voice signals. Each telephony port module includes one or more digital signal processors. Each digital signal processor performs one or more processing functions on the received telephony voice signals. Each telephony port module may transfer a received telephony voice signal for processing to any of the digital signal processors on any telephony port module. In this manner, digital signal processors are not congested or idle within the system.

The present invention may provide various technical advantages over conventional telecommunications systems. For example, one technical advantage may be in the ability to perform processing on a telephony voice signal anywhere in the system regardless of where it was received. Another technical advantage may be in the reduction of the need for costly ATM switch ports through an effective oversubscription technique. Yet another technical advantage may be in the balancing of system resources to improve overall system operation. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
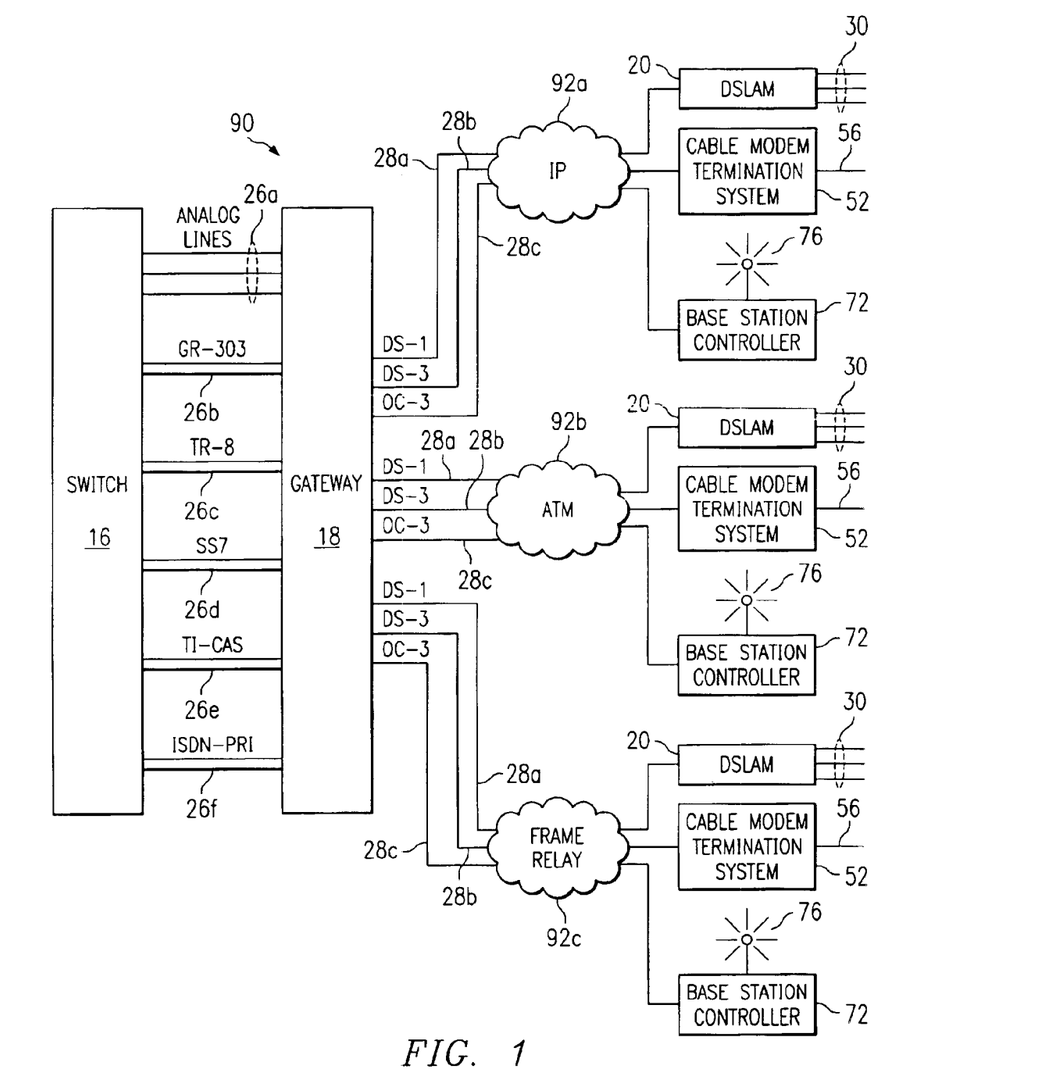
FIG. 1 illustrates a block diagram of a telecommunications network.

FIG. 1 illustrates system 90 that uses several, alternative telecommunication interfaces 26, data compression algorithms, data communication protocols, and data links 28 to couple a telecommunication switch 16 to DSL, cable, and wireless platforms. System 90 includes switch 16, gateway 18, DSLAMs 20, CMTSs 52, and BSCs 72. To communicate telecommunication information over the DSL, cable, and wireless platforms, gateway 18 performs various compression and protocol conversions to couple switch 16 to DSLAMs 20, CMTSs 52, and BSCs 72. Gateway 18 supports several, alternative telecommunication, compression, and broadband technologies so that it is compatible with many different switches 16, access networks 92, DSLAMs 20, CMTSs 52, and BSCs 72.

Gateway 18 communicates telecommunication information with switch 16 using several, alternative telecommunication interfaces 26. Unbundled analog lines 26a communicate telecommunication information using analog signals. Each analog line 26a communicates a separate call. In contrast, GR-303 interface 26b, TR-8 interface 26c, and SS7 interface 26d are concentrated digital interfaces that can communicate more than one call over a single line. Although FIG. 1 illustrates analog lines 26a, GR-303 interface 26b, TR-8 interface 26c, and SS7 interface 26d, gateway 18 may communicate telecommunication information with switch 16 using any suitable telecommunication interface 26. For example, in an alternative embodiment, gateway 18 may communicate telecommunication information with switch 16 using TR-CAS interface 26e, ISDN lines 26f, or other link types such as V5.

Gateway 18 compresses and de-compresses telecommunication information using several, alternative compression algorithms. To facilitate efficient communication of data packets over DSL, cable, and wireless platforms, gateway 18 may compress and decompress telecommunication information using G.711, G.723, G.728, G.729, or any other suitable compression algorithm. Gateway 18 receives telecommunication information from switch 16, compresses the telecommunication information using several, alternative compression algorithms, and communicates the compressed telecommunication information to DSLAMs 20, CMTSs 52, and BSCs 72. Gateway 18 also receives compressed telecommunication information from DSLAMs 20, CMTSs 52, and BSCs 72, de-compresses the telecommunication information using several, alternative compression algorithms, and communicates the de-compressed telecommunication information to switch 16.

Gateway 18 communicates telecommunication information with DSLAMs 20, CMTSs 52, and BSCs 72 using several, alternative data communication protocols. Gateway 18 receives telecommunication information from switch 16, generates data packets encapsulating the telecommunication information according to several, alternative data communication protocols, and communicates the data packets to DSLAMs 20, CMTSs 52, and BSCs 72. Gateway 18 also receives data packets from DSLAMs 20, CMTSs 52, and BSCs 72. Gateway 18 extracts telecommunication information from the data packets according to several, alternative data communication protocols, and communicates the telecommunication information to switch 16.

By supporting several, alternative data communication protocols, gateway 18 may communicate telecommunication information with DSLAM 20, CMTSs 52, and BSCs 72 using an IP network 92*a*, an ATM network 92*b*, or a Frame Relay network 92*c* (collectively, access networks 92). Access networks 92 may include any suitable combination of data switches, routers, or other data communication equipment that communicates data packets using a data communication protocol. Although FIG. 1 illustrates IP, ATM, and frame relay networks 92, gateway 18 may use any suitable data communication protocol and corresponding network 92 to communicate data packets with DSLAMs 20, CMTSs 52, and BSCs 72.

In a particular embodiment, gateway 18 sets priority bits in a subscriber's data packets according to the subscriber's assigned quality of service. If a subscriber is assigned a high quality of service, gateway 18 sets the priority bits in the subscriber's data packets so that the packets receive a high priority in communication through one of networks 92*a*, 92*b*, and 92*c*. If a subscriber is assigned a low quality of service, gateway 18 sets the priority bits in the subscriber's data packets so that the packet receives a low priority in communication through one of networks 92*a*, 92*b*, and 92*c*.

Gateway 18 communicates data packets using several, alternative data links 28. Although FIG. 1 illustrates DS-1 lines 28*a*, DS-3 lines 28*b*, and OC-3 lines 28*c*, gateway 18 may communicate data packets using any other suitable data link 28. For example, in an alternative embodiment, gateway 18 communicates data packets using 10 Mbps, 100 Mbps, 1000 Mbps, or any other suitable version of Ethernet over coaxial, twisted-pair, fiber, or other suitable type of cable. As described above, data links 28 may couple gateway 18 directly to DSLAMs 20, CMTSs 52, and BSCs 72, or data links 28 may couple gateway 18 to data switches, routers, or any other suitable data communication equipment that communicates data packets with DSLAMs 20, CMTSs 52, and BSCs 72.

Gateway 18 uses subscriber profiles to properly employ the alternative telecommunication, compression, and broadband technologies. A subscriber profile may associate an individual subscriber or a group of subscribers with a combination of telecommunication interfaces 26, data compression algorithms, data communication protocols, and data links 28. For example, in a particular embodiment, a profile may associate the subscribers serviced by each of an IAD, a MTA, or a WNIU as a group with a telecommunication interface 26, a data compression algorithm, a data communication protocol, and a data link 28. The subscriber profiles may also indicate each subscriber's assigned quality of service and whether gateway 18 should perform echo cancellation on each subscriber's telecommunication information.

When gateway 18 receives telecommunication information from switch 16, gateway 18 identifies a subscriber associated with the telecommunication information and communicates the telecommunication information to DSLAM 20, CMTS 52, or BSC 72 according to the subscriber's stored profile. If the profile indicates that gateway 18 should perform echo cancellation on the telecommunication information, gateway 18 performs echo cancellation on the telecommunication information. Gateway 18 also compresses the telecommunication information using a compression algorithm indicated in the subscriber profile, generates data packets encapsulating the telecommunication information according to a data communication protocol indicated in the subscriber profile, and communicates the data packets to data link 28 indicated in the subscriber profile. In a particular embodiment, gateway 18 sets priority bits in the subscriber's data packets according to the quality of service indicated in the subscriber's stored profile.

In a particular embodiment, each subscriber is associated with one of interfaces 26, and gateway 18 identifies a subscriber associated with telecommunication information according to interface 26 from which gateway 18 receives the telecommunication information. For example, each subscriber may be associated with one of unbundled analog lines 26*a*. When gateway 18 receives telecommunication information from one of analog lines 26*a*, gateway 18 identifies a subscriber associated with analog line 26*a* and communicates the telecommunication information according to the subscriber's profile. Similarly, each subscriber may be assigned a time slot in GR-303 interface 26*b*, TR-8 interface 26*c*, SS7 interface 26*d*., or T1-CAS interface 26*e*. When gateway 18 receives telecommunication information from the assigned time slot in GR-303 interface 26*b*, TR-8 interface 26*c*, SS7 interface 26*d*, or T1-CAS interface 26*e*, gateway 18 identifies a subscriber associated with the time slot and communicates the telecommunication information according to the subscriber's profile. Gateway 18 receives a subscriber identifier with telecommunication information from switch 16, identifies a subscriber associated with the telecommunication information using the subscriber identifier, and then communicates the telecommunication information according to the subscriber's stored profile. The subscriber identifier may be a name, address, telephone number, or any other suitable subscriber information associated with subscribers serviced by gateway 18.

When gateway 18 receives a data packet from DSLAM 20, CMTS 52, or BSC 72, gateway 18 extracts telecommunication information from the data packet, identifies a subscriber associated with the telecommunication information, and communicates the telecommunication information to switch 16 according to the subscriber's profile. Gateway 18 de-compresses the <telecommunication information using a compression algorithm indicated in the subscriber profile, selectively performs echo cancellation on the telecommunication information as indicated in the subscriber profile, and communicates the telecommunication information to switch 16 using interface 26 indicated in the subscriber profile. In a particular embodiment, gateway 18 associates subscriber profiles with data network addresses, and gateway 18 identifies a subscriber associated with telecommunication information according to a source or destination address of the data packet. In an alternative embodiment, the data packet includes a name, address, telephone number, or other subscriber identifier that gateway 18 uses to identify a subscriber associated with the telecommunication information.

Because gateway 18 supports several, alternative telecommunication, compression, and broadband technologies, it provides an integrated solution that is compatible with many different DSL, cable, wireless or other broadband platforms. As a result telecommunication providers can deploy system 90 with greater flexibility and in a more cost effective manner.

Figure 2:
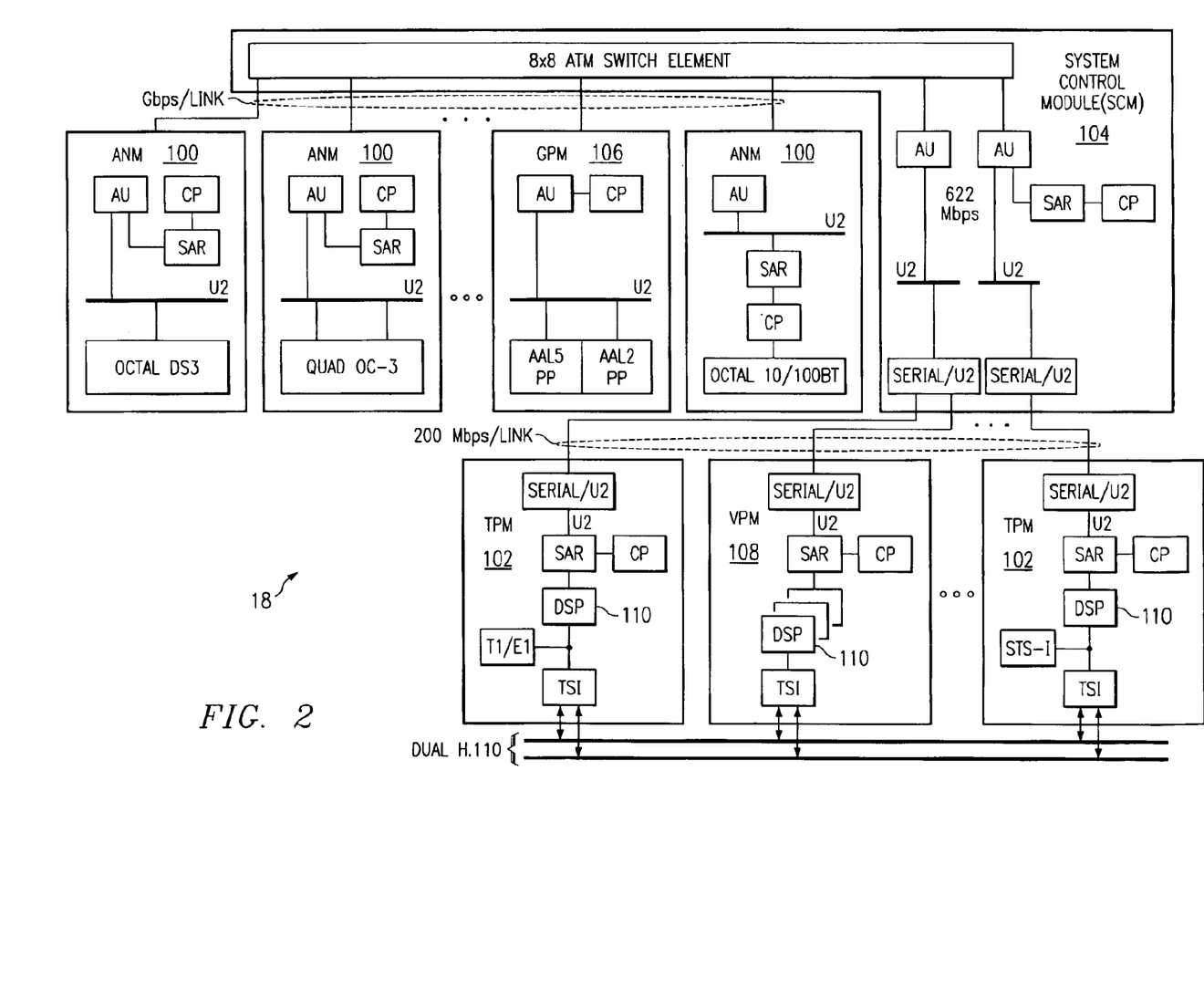
FIG. 2 illustrates a block diagram of a voice gateway in the telecommunications network.

FIG. 2 is a block diagram of gateway 18. Gateway 18 includes one or more access network modules 100, one or more telephony port modules 102, and one or more system controller modules 104. Gateway 18 may also include a general processor module 106 and a voice processing module 108. System controller module 104 performs overall control functions for gateway 18 and manages the flow of information between and among the other modules within gateway 18. Telephony port module 102 provides interfaces to PSTN 11 such as GR-303, ISDN-PR1, V5.2, and TR-8 and may support T1, E1, and STS-1, among other, implementations. Access network module 100 provides redundant interfaces to a backbone broadband network, including ATM and IP networks, and may support DS-3, OC-3, 10/100BT ethernet, among other, implementations. Voice processing module 108 provides a centralized signal processing function primarily for voice data compression/decompression, and echo cancellation. General processor module 106 provides a centralized processing resource for functions such as RTP header compression or other processing for VoIP/ATM interworking.

Telephony port module 102 and voice processing module 108 include digital signal processor resources, such as digital signal processors 110, to perform compression/decompression, echo cancellation, and other voice processing functions. In order to provide effective and efficient operation of gateway 18, each digital signal processor 110 may be shared among telephony port module 102 and voice processing module 108 regardless of the location of a particular digital signal processor 110. In this manner, digital signal processing resources may be shared by these interfaces to public switched telephone network 11. By sharing digital signal processing resources between PSTN 11 interfaces, specific resources may be assigned to specific interfaces on a dynamic basis. Dynamic assignment results in fewer digital signal processors 110 with better utilization. Sharing of resources also allows for digital signal processors 110 to be added to the system. The addition of digital signal processors 110 allows a customer to address future voice processing needs without scrapping existing system investments and without interrupting existing service.

Figure 3:
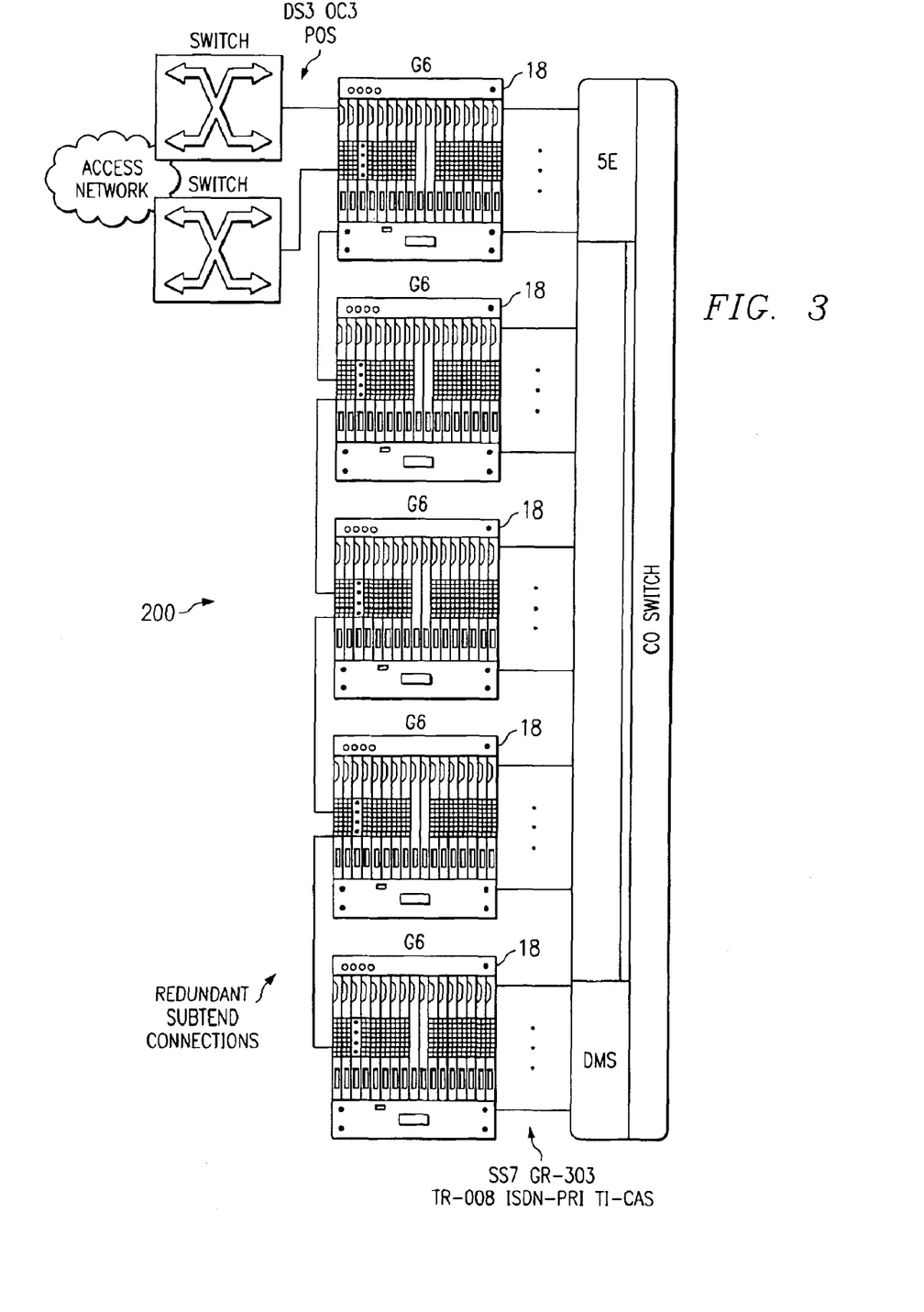
FIG. 3 illustrates an example of an enhanced voice gateway system for the telecommunications network.

FIG. 3 shows an extension of the sharing of digital signal processing resources, in this case an ATM switch port, in a system 200 having multiple gateways 18. System 200 allows more users to share a single ATM switch port. Since ATM switches have a high per-port cost, the subtending technique provided by system 200 reduces network expenses by eliminating a need for more ports to the ATM switch. This subtending technique allows the sharing of digital signal processing resources to span across multiple gateways 18. PSTN 11 interfaces, digital signal processing resources, and ATM switch port interfaces can be shared and added across multiple shelves of gateway system 200. Gateways 18 may be connected in any manner, including daisy chains, rings, and tree configurations.

Figure 4:
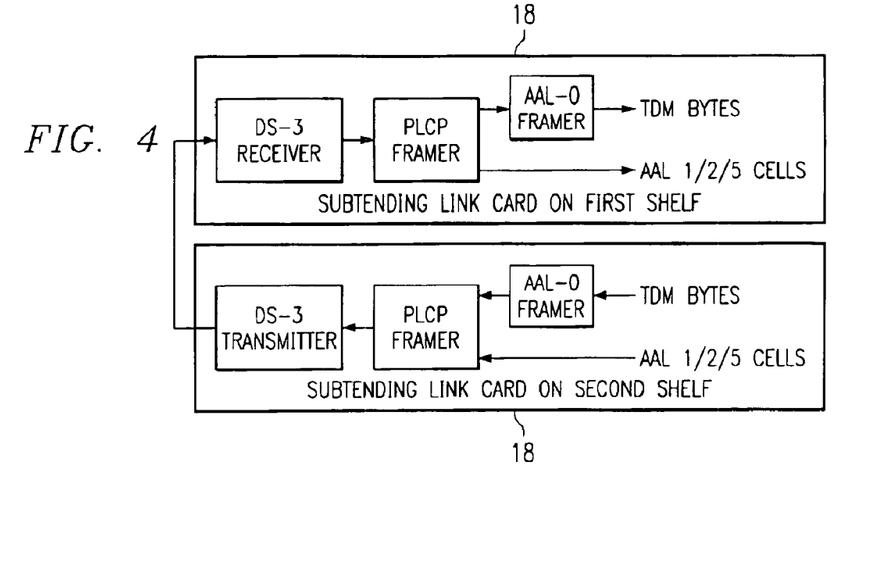
FIG. 4 shows an example of a subtending link between gateways of a multi-gateway system.

FIG. 4 shows an example of a subtending link between gateways 18. A subtending link is provided from one gateway 18 to another. The subtending link may be a wide area network only link or a hybrid WAN/TDM link. For subtending configurations where delay is unimportant (due to TDM to WAN conversion), a WAN only link may be used. For configurations where delay is desired to be minimized, a combination WAN/TDM link may be used. An example of a combination WAN/TDM link is a DS-3 in PLCP mode. In this example, the DS-3 signal is frequency locked to the PSTN 11 interface. The first half of the payload is dedicated to WAN traffic and the second half of the payload is dedicated to TDM traffic. With twelve ATM cells being carried in the DS-3 PLCP mode, the first six ATM cells carry AAL-1/2/5 encoded WAN traffic. The second six ATM cells carry TDM bytes placed directly in AAL-0 payloads. TDM bytes placed in AAL-0 payloads do not experience the delay found in AAL-1/2/5 payloads. In AAL-1/2/5, payloads are filled by channel with bytes in a channel being delayed while waiting for bytes in the same channel. The AAL-0 payloads are filled with TDM bytes as they arrive on a TDM bus without the need to wait.

Figure 5A:
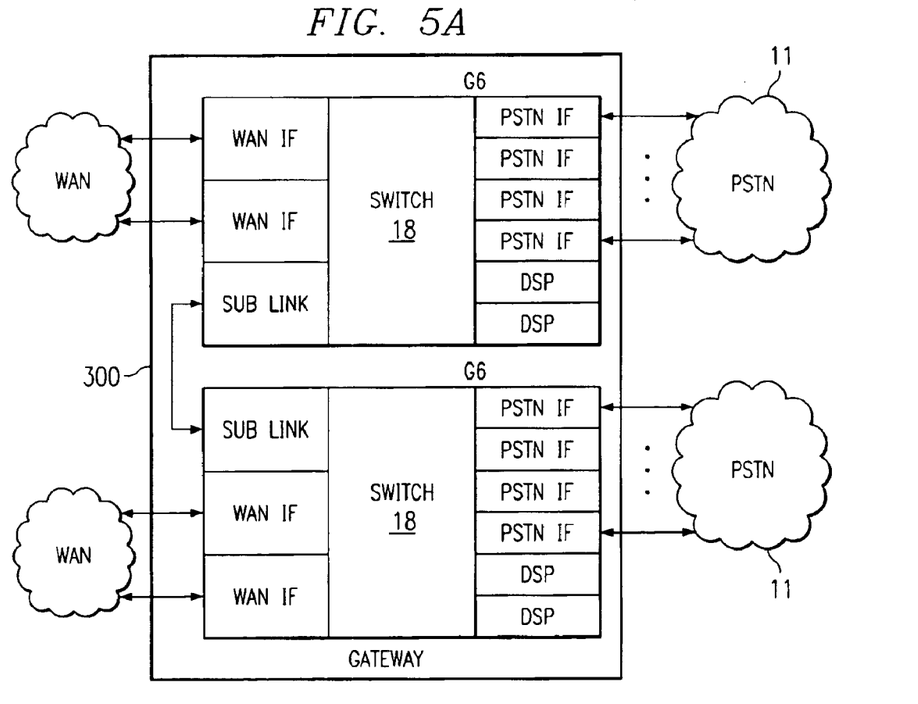
FIGS. 5A–C illustrate the evolution of a gateway system that implements resource-sharing and subtending.
Figure 5B:
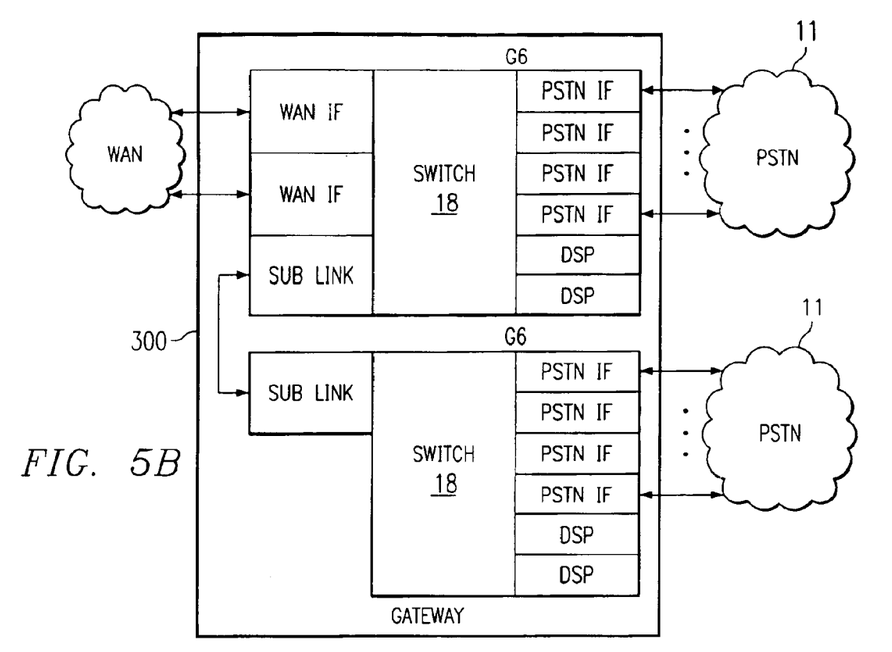
Figure 5C:
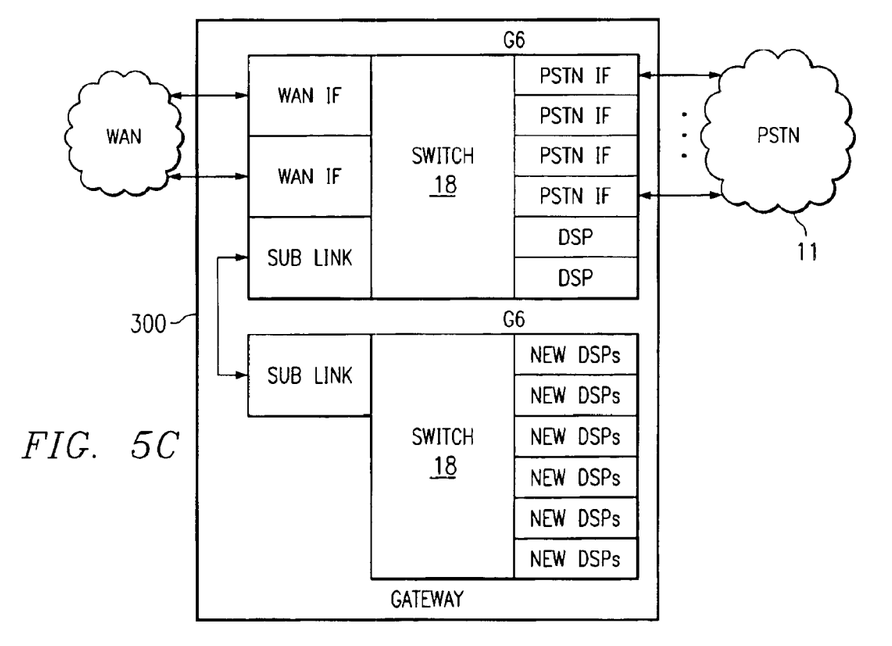

FIGS. 5A–C show the evolution of a system that implements resource sharing and subtending. FIG. 5A shows a multi-gateway system 300 that provides intershelf resource sharing through a subtending link. Intrashelf resource sharing may also be performed by a single gateway 18. FIG. 5B shows how multi-gateway system 300 may be used to reduce the number of ATM switch ports as discussed above and provide better ATM switch port utilization. FIG. 5C shows an ability to reduce the number of interfaces to PSTN 11 in order to provide PSTN interface sharing and WAN interface sharing and provide added digital signal processing resources as discussed above. New WAN interfaces may be added as desired to increase WAN capacity, add new WAN interface types (Ethernet, SONET, DS-3), add higher layer protocol functionality (IP forwarding, TCP forwarding), and provide additional ATM switch ports in order to handle increased capacity of Multi-gateway system 300 and without affecting existing investment or interrupting current service. PSTN interfaces may be subsequently added to increase capacity, add new interface types (T1, E1, STS-1) and add higher layer protocol functionality (V5.2, GR-303, ISDN) without affecting existing system investment or interrupting current service. Thus, multi-gateway system 300 is flexible to handle any desired configuration to support subscribers and provide an over subscription scenario that is manageable.

Thus, there has been provided, in accordance with the present invention, a system and method for interfacing telephony voice signals with a broadband access network that satisfies the advantages set forth above. Although the present invention has been described in detail, it should be understood that various changes, substitutions, and alterations may be readily ascertainable to those skilled in the art and may be made herein without departing from the spirit and scope of the present invention as defined by the following claims.

What is claimed is:

1. A system for interfacing telephony voice signals with a broadband access network, comprising:

a plurality of telephony port modules each operable to receive telephony voice signals, each of the plurality of telephony port modules including one or more digital signal processors, each digital signal processor operable to perform one or more processing functions on the telephony voice signals, wherein each of the plurality of telephony port modules may transfer a received telephony voice signal to any digital signal processor on any of the plurality of telephony port modules.

2. The system of claim 1, wherein a particular digital signal processor performs the processing functions on the telephony voice signals, the particular digital signal processor returning processed telephony voice signals to an originating telephony port module upon completion of processing function performance.

3. The system of claim 1, wherein specific digital signal processors are assigned to perform a specific processing function.

4. The system of claim 3, wherein the specific digital signal processors may be dynamically assigned to perform a different specific processing function than originally assigned.

5. The system of claim 1, wherein the processing functions performed by any digital signal processor include at least one of voice compression, voice decompression, and echo cancellation.

6. A gateway system for interfacing telephony signals with a broadband access network, comprising:

an access network module operable to interface with the broadband access network;

at least one telephony port module operable to interface with a public switched telephone network, the telephony port module including a plurality of digital signal processors operable to perform processing functions on telephony signals received from either the broadband access network or the public switched telephone network;

a system controller module operable to manage a flow of telephony signals between the access network module and the telephony port module, the telephony port module operable to assign telephony signals to any digital signal processor of the telephony port module.

7. The gateway system of claim 6, wherein the telephony port module receiving telephony signals for processing may transfer the telephony signals to one or more digital signal processors on a different telephony port module.

8. The gateway system of claim 6, wherein the telephony port module dynamically assigns telephony signals to digital signal processors to improve digital signal processor utilization.

9. The gateway system of claim 6, wherein the telephony port module performs processing of telephony signals according to subscriber profiles.

10. The gateway system of claim 6, wherein the telephony signals from a different gateway system may be processed on digital signal processors in the telephony port module.

11. A gateway system for interfacing telephony signals with a broadband access network, comprising:

a first gateway operable to interface between a broadband access network and a public switched telephone network, the first gateway including a first interface communicating with the broadband access network, the first gateway including a second interface operable to communicate with the public switched telephone network, the first gateway including a plurality of digital signal processors operable to process telephony signals passing through the first gateway;

a second gateway operable to interface with the first gateway, the first gateway operable to share the first and second interfaces and the plurality of digital signal processors with the second gateway.

12. The gateway system of claim 11, wherein the second gateway includes a plurality of digital signal processors, the second gateway operable to share the plurality of digital signal processors in the second gateway with the first gateway.

13. The gateway system of claim 11, wherein the second gateway includes a third interface operable to communicate with the public switched telephone network, the second gateway operable to share the third interface with the first gateway.

14. The gateway system of claim 11, wherein the second gateway includes a fourth interface operable to communicate with the broadband access network, the second gateway operable to share the fourth interface with the first gateway.

15. The gateway system of claim 11, wherein the first gateway includes a third interface operable to communicate with the public switched telephone network, the third interface providing additional subscriber capacity, the first gateway operable to share the third interface with the second gateway.

16. A method for interfacing telephony signals with a broadband access network, comprising:

receiving a telephony signal at a first gateway of a gateway system in a telecommunications network;

providing the telephony signal for processing to one of a plurality of digital signal processors in the gateway system, the plurality of digital signal processors being shared across the gateway system, the one of the plurality of digital signal processors being in a second gateway of the gateway system.

17. The method of claim 16, further comprising:

sharing interfaces to the broadband access network and to a public switched telephone network between the first gateway and the second gateway of the gateway system.

* * * * *